United States Patent [19]
Leimkoetter

[11] Patent Number: 5,706,287
[45] Date of Patent: Jan. 6, 1998

[54] COMMUNICATION SYSTEM

[75] Inventor: Ulrich Leimkoetter, Gelsenkirchen, Germany

[73] Assignee: Siemens Aktiengesellschaft, Munich, Germany

[21] Appl. No.: 602,613

[22] Filed: Feb. 16, 1996

[30] Foreign Application Priority Data

Feb. 16, 1995 [DE] Germany .................. 195 05 271.4

[51] Int. Cl.$^6$ .............................. H04L 12/52; H04Q 11/04
[52] U.S. Cl. .............................. 370/410; 70/420; 70/426
[58] Field of Search .......................... 370/357, 360, 370/384, 385, 389, 395, 410, 420, 421, 422, 423, 426, 503, 514, 520, 522, 524, 525, 526, 904

[56] References Cited

U.S. PATENT DOCUMENTS

| | | | |
|---|---|---|---|
| 4,932,024 | 6/1990 | Bonicioli et al. | 370/458 |
| 5,333,299 | 7/1994 | Koval et al. | 370/503 |
| 5,349,579 | 9/1994 | Madonna et al. | 370/524 |
| 5,448,564 | 9/1995 | Thor | 370/392 |

FOREIGN PATENT DOCUMENTS 0 519 106 A1  6/1991  European Pat. Off. .

Primary Examiner—Alpus H. Hsu
Attorney, Agent, or Firm—Hill, Steadman & Simpson

[57] ABSTRACT

A communications system is disclosed for switching connected communications terminal devices includes a central module including a processor-controlled base unit and a supplementary unit as well as at least one peripheral subscriber module and up to four subscriber transmission units. The peripheral subscriber modules and the subscriber transmission units allow the connection of communications terminal devices or, alternatively, the connection to public communications networks is possible. A switching element implemented in the base unit supports an ISDN-oriented interface to which up to four particularly low-cost subscriber transmission units may be connected. A small or mid-sized communications system having a modular construction can thereby be designed in such a fashion as to be expandable at the lowest expense while allowing flexibility of configuration.

9 Claims, 2 Drawing Sheets

COMMUNICATION SYSTEM

BACKGROUND OF THE INVENTION

1. Field of the Invention

The present invention relates generally to the field of telecommunication devices and, more particularly, the present invention relates to an improved modular telecommunications device.

2. Description of the Related Art

Communications systems for a small number of connectable communications terminal devices currently employ modular construction system designs which use mid-sized communications systems. One such system design based on an HDLC-oriented (High-Level Data Link Control) interface as an external bus interface is known from European letters patent EP 0 519 106. A system design of this type comprises a central module having a base unit and a supplementary unit connected thereto. The base unit comprises a central processor operating under control of a multitask operating system for controlling the communications system. It further includes a system memory and a means for controlling peripheral equipment modules. An internal bus of the base unit, made up of data, address and status circuits, connects the central processor, the system memory and the peripheral equipment module controller. There is a connection from the central processor to an HDLC-oriented interface through the peripheral equipment module control means enabling the connection of peripheral modules inside and outside the central module. A high degree of information exchange takes place between the peripheral modules and the central module.

The connection to the HDLC-oriented interface requires that each connected module incorporate a processor and a peripheral module control means corresponding to the peripheral module control means in the base unit. The supplementary unit comprises at least one switching element, which performs functions of pulse and tone generation as well as the synchronization of information processing. Peripheral subscriber modules for connecting the communications terminal devices, as well as a processor and a peripheral module control means are therefore provided alongside the subscriber transmission unit and a peripheral control means that effects switching and signaling of connected communications elements.

The transmission of speech and signaling information, as well as data, at a high transmission speed is possible via such an HDLC-oriented interface. The high cost of components which arises primarily due to the use of the processors and peripheral module control means is justified in implementation of larger communications systems. The system design is, however, less suited for use with mid-sized systems that are to be expanded and modified at low cost. The underlying object of the present invention is to design a small or mid-sized communications system of modular construction which is expandable at low expense while allowing flexible configuration.

SUMMARY OF THE INVENTION

One central aspect of the communications system according to the present invention lies in the peripheral equipment control means which effects switching and signaling of the connected communications terminal devices assigned to the central processor. This peripheral equipment control means supports several ISDN-oriented interfaces to which subscriber transmission units of limited circuit complexity can be connected. Through these additional ISDN-oriented interfaces there ensues an increased multiplicity of combinations for expansion and configuration of a small or mid-sized communications system. This creates the possibility of integrating new generations of low-cost peripheral modules as an expansion or reconfiguration of existing communications system. This advantageously increases flexibility for expansion or reconfiguration of existing communication systems. The subscriber transmission units are advantageously designed as peripheral ISDN transmission units that can be manufactured at low cost or as ISDN base connection units.

With the inclusion of the HDLC-oriented interfaces, the supplementary units can be designed so as to additionally comprise a peripheral equipment module control means and a processor connecting the switching element and the peripheral equipment module control means. In such a design, the peripheral equipment module control means in the supplementary unit is connected to an HDLC-oriented interface for the peripheral equipment module control means of the base unit. This alternative design is advantageous as a standard variant, because the processor functions in the base unit remain largely unaffected and the supplementary unit is operated as an internal peripheral module.

The supplementary unit can also be designed in a more cost-effective way. In this alternate configuration, the switching element, comprising the additional functions for pulse and tone generation as well as functions for the synchronization of the information processing, is also connected to the internal bus of the base unit. In this variant, the processor of the base unit also controls the switching element. For example, the central processor and the peripheral equipment control means take over the switching functions and some additional functions of the switching element. The switching element, comprising the additional functions for pulse and tone generation as well as functions for the synchronization of the information processing can thereby be simplified so that switching functions and some of the additional functions can be eliminated. More cost-effective construction of the switching element can be implemented because the switching functions are additionally taken over by the peripheral equipment control means.

According to an advantageous design, the subscriber transmission units are connected not via the connection means used for HDLC interfaces, but rather via a separate connection of the central module. Thus, the existing number of connectable peripheral modules is not reduced, and expansion of existing communications systems is possible. For example, this may be accomplished through additional peripheral modules. The separate connection means of the central module is more advantageously arranged as a detachable connection on the front side of the central module, such as a plug connector.

Application-specific processing by the central processor of events which are either transmitted to the communications terminal devices or are received by the communications terminal devices requires the parallel use of different interfaces and prioritization for prior processing of events for call, tone and path signaling compared to steps required for display signaling. For this purpose the intermediate memory for events to be sent to the terminal devices is partitioned into an intermediate memory for call, tone and path signaling events to be processed with high priority, and an intermediate memory for low-priority display signal events.

The size of the intermediate memory for the intermediate storage of a display signaling event can be minimized by constructing the base unit in such a manner that the intermediate storage of a display signaling event occurs only if no as yet unsent events are present in the intermediate memory for display signaling. The intermediate memory is preferably constructed as a ring memory.

DESCRIPTION OF THE PREFERRED EMBODIMENTS

Figure 1:
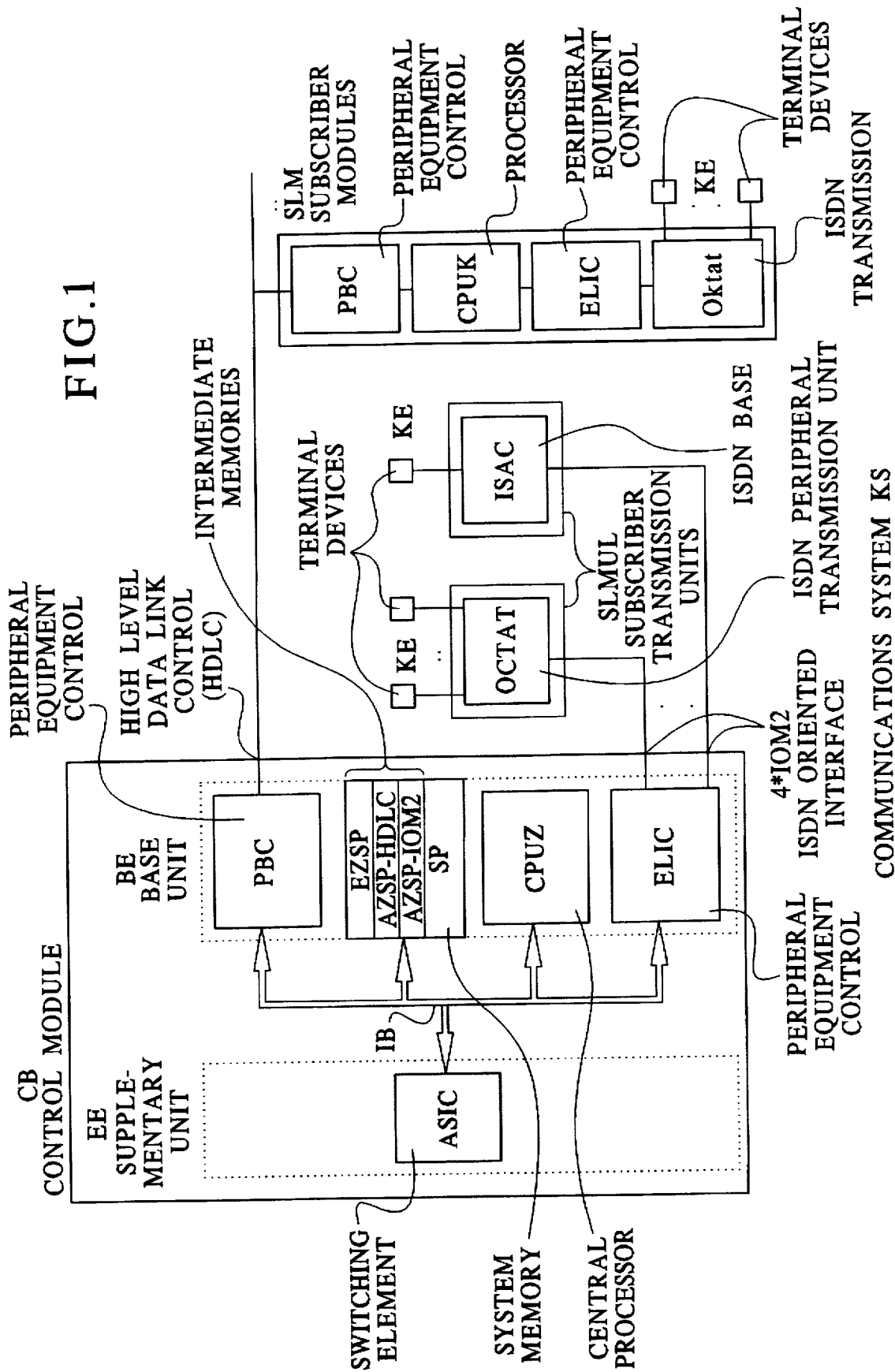
FIG. 1 is a block diagram illustration of a communications system having a simplified supplementary unit.

In FIG. 1, a communications system KS for the switching of connected communications terminal devices KE is shown. The communications system comprises a central module CB that further comprises a base unit BE and a supplementary unit EE, as well as peripheral subscriber modules SLM and subscriber transmission modules SLMUL. The base unit BE, comprises a central processor CPUZ, a system memory SP containing events to be received or sent respectively by intermediate memories EZSP, AZSP, a peripheral equipment module control means PBC and a peripheral equipment control means ELIC that performs switching and signaling of connected communications terminal devices KE. These elements are connected to one another via an internal bus IB. The central processor CPUZ, with the aid of the system memory SP, controls the peripheral equipment module control means PBC, the peripheral equipment control means ELIC that effects switching and signaling of connected communications terminal devices and a switching element ASIC. The switching element ASIC represents the supplementary unit EE and performs additional functions for pulse and tone generation for synchronization of information processing. The communications system KS performs switching of communications terminal devices KE connected via two different types of interfaces. These interfaces are an HDLC-oriented (High-Level Data Link Control) interface and up to four ISDN-oriented interfaces IOM2 (ISDN-Oriented Modular).

The HDLC-oriented interface HDLC controls a serial bus with a master/slave partitioning in which the processor-controlled central module CB is the master and the processor-controlled peripheral subscriber modules SLM are the slaves. The peripheral subscriber modules, SLM, are polled by the central module CB for event-status changes and are supplied with signaling events. Each peripheral subscriber module is assigned a special address corresponding to its location. In the ISDN-oriented interface IOM2, there is a serial communications bus that transmits speech, data or control information respectively via time-division multiplexing. Multiplexing makes it possible to transmit a maximum of eight ISDN subscriber lines via one ISDN-oriented interface IOM2. The HDLC-oriented interface HDLC, supported by the peripheral equipment module control means PBC of the base unit, enables the connection of the communications system KS with a communications network as well as the switching of the communications terminal devices KE connected to the peripheral subscriber modules SLM.

The peripheral subscriber modules SLM may be constructed in various ways. By way of example, in FIG. 1, the peripheral subscriber module SLM consists of a peripheral equipment module control means PBC that creates the connection to the HDLC-oriented interface HDLC and a processor CPUK that controls the peripheral subscriber module SLM. The peripheral subscriber module further comprises a peripheral equipment control means ELIC that effects the switching and signaling of connected communications terminal devices KE and an ISDN transmission unit OCTAT.

The processor CPUK is connected with the peripheral equipment module control means PBC and the peripheral equipment control means ELIC. The peripheral equipment control means ELIC is connected with the ISDN transmission unit OCTAT. Eight transmission circuits am integrated into the ISDN transmission unit OCTAT. Each of these transmission circuits includes an Up interface operating according to a burst operation process. Each of these Up interfaces may be connected with a communications terminal device KE which is also outfitted with an Up interface of the same type that thus enables the bidirectional transmission of information.

The peripheral equipment control means ELIC of the base unit BE supports up to four ISDN-oriented interfaces IOM2. As shown in FIG. 1, by way of example, a peripheral ISDN transmission unit OCTAT is connected to an ISDN-oriented interface IOM2. An ISDN base connection unit ISAC is connected to another ISDN-oriented interface IOM2. Other arbitrary combinations are possible for connecting to the four ISDN-oriented interfaces IOM2. The peripheral ISDN transmission unit OCTAT and the ISDN base connection unit ISAC implement simple subscriber transmission units SLMUL that allow the direct connection of communications terminal devices KE. An ISDN connection of a public communications network can also be connected to an ISDN base connection unit ISAC via a So interface.

In the communications system KS, the connection of peripheral subscriber modules SLM to the HDLC-oriented interface HDLC may be accomplished via a connection means such as rear panel wiring on the rear side of the central module CB. For expansion of the communications system KS of this type, the subscriber transmission units SLMUL are desirably connected to these via a plug connector on the front side of the central module CB. No modifications of the rear panel wiring are thus required and flexible allocation of the subscriber transmission units SLMUL to the ISDN-oriented interfaces IOM2 is possible.

The control of the central module CB by means of the central processor CPUZ is based on central event-status processing. With the help of the central processor CPUZ, operating switching and administrative control of the communications system KS takes place through operation of a multitask operating system. Events containing signaling and switching information in the context of connection signaling are sent to the communications terminal devices KE by the communications system KS. Alternatively, they are received by the communications system KS as they come from the communications terminal devices KE. The events received from the communications terminal devices KE are saved in the intermediate memory EZSP. Two differently prioritized intermediate memories are employed to store the events to be sent to the communications terminal devices KE. The intermediate memory AZSP for the events to be sent comprises an intermediate memory AZSP-HDLC for call, tone and path signaling events. These events have high priority and are to be processed first. Intermediate memory AZSP-IOM2 is employed for display signaling events. For low-priority display signaling events (LED or display signaling), the intermediate storage of events to be sent on to a communications terminal device KE is held back if this communications terminal device KE has not yet processed the previous display signaling event. Additional events to be sent to this communications terminal device KE are thus still present in the intermediate memory for display signaling (AZSP-IOM2).

Figure 2:
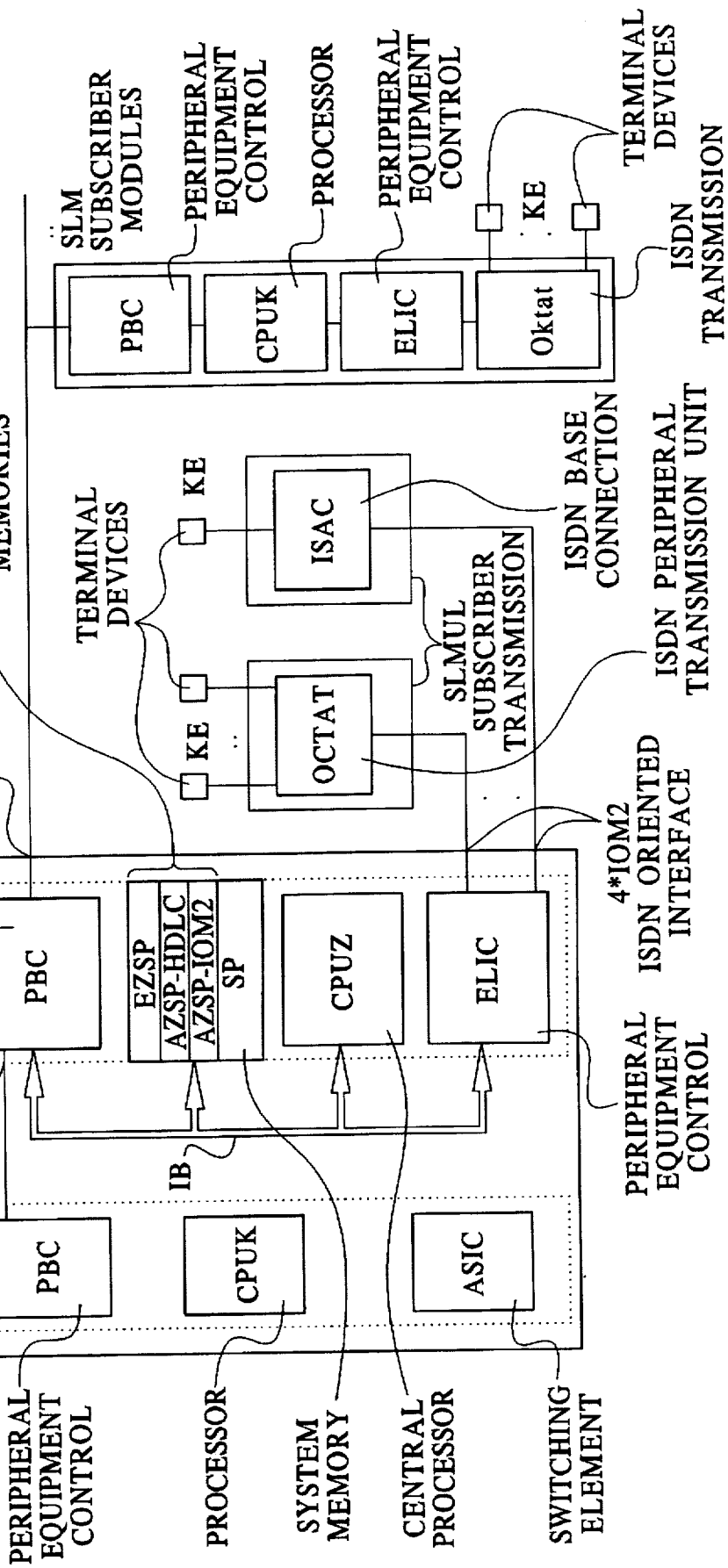
FIG. 2 is a block diagram illustration of a communications system having a supplementary unit which may be connected via an HDLC-oriented interface.

In FIG. 2, the communications system from FIG. 1 is modified only in that the supplementary unit EE is designed differently and is connected to the base unit BE via an HDLC-oriented interface HDLC. The supplementary unit EE consists of a processor CPUK, connected with a switching element ASIC, which performs additional functions for pulse and tone generation and for synchronization of information processing. This unit also contains a peripheral equipment module control means PBC. The supplementary unit EE is connected via its peripheral equipment module control means PBC to the HDLC-oriented interface of the peripheral equipment module control means of the base unit. It thus enables the central module CB to gain access to additional functions such as for synchronization of information processing in the switching element ASIC. Through the parallel use of the HDLC-oriented interfaces HDLC and the ISDN-oriented interfaces IOM2, the communications systems KS according to FIG. 1 and FIG. 2 allow flexible configuration and expansion of an existing communications system at low cost, without reductions in the previously existing configuration.

The communications system KS according to FIG. 1 requires a larger redesign expenditure than does the communications system KS according to FIG. 2 in which the processor functions of the base unit BE remain largely uninfluenced. However, the variant of the communications system KS according to FIG. 1 contains a greater potential for savings due to the simplified and more cost-effective design of the supplementary unit EE.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A communication system for switching connected communications terminal devices comprising:

a central module for providing central event-status control and switching, said central module comprising a base unit having an internal bus connected to a central processor;

a system memory comprised of first and second application-specific intermediate memories wherein said first intermediate memory stores events received from communications terminal devices and events to be sent to the communications terminal devices and information for display signaling and the second intermediate memory stores tone and path signaling information;

peripheral equipment module control means connected to the internal bus for providing an HDLC-oriented interface for connecting peripheral modules; and a supplementary unit connected to the base unit, said supplementary unit comprising at least one switching element further comprising means for generating pulses and tones and for synchronization of information processing; and said system having at least one peripheral module connected to the HDLC-oriented interface;

the central processor being connected via the internal bus to the peripheral equipment module control means that performs switching and signaling of connected communications terminal devices; and an ISDN-oriented interface connected to the peripheral equipment control means further connected to subscriber transmission units for connection of additional communications terminal devices.

2. The communications system of claim 1, wherein the subscriber transmission units are comprised of either peripheral ISDN transmission units or ISDN base connection units.

3. The communications system of claim 1, wherein the supplementary unit further comprises a supplementary peripheral equipment module control means and a processor connected between the switching element and the supplementary peripheral equipment module control means; and further wherein the supplementary unit is connected via its peripheral equipment module control means with the HDLC-oriented interface of the peripheral equipment module control means of the base unit.

4. The communications system of claim 2, wherein the switching element of the supplementary unit further comprises a means for generating pulses and tones and a means for synchronizing information processing connected to the internal bus of the base unit.

5. The communications system of claim 4, wherein the connection of the subscriber transmission units to the ISDN-oriented interface comprises a separate connection means of the central module.

6. The communications system of claim 5, wherein the separate connection means of the central module is comprised of a detachable connection on a front side of the central module.

7. The communications system of claim 6, wherein the detachable connection is a plug connector.

8. The communications system of claim 7, wherein the second intermediate memory is partitioned into an intermediate memory for call, tone and path signaling events to be processed with high priority, and an intermediate memory for low-priority display signaling events.

9. The communications system according to claim 1 wherein the intermediate storage of a display signaling event for a communications terminal device in the first intermediate memory for display signaling occurs only if there are no as yet unsent events for this communications terminal device in the first intermediate memory for a display signaling.

* * * * *